United States Patent

[11] 3,604,482

[72] Inventors Edward C. Warrick
Pittsburgh, Pa.;
Emerson Berends, Tupelo, Miss.
[21] Appl. No. 871,365
[22] Filed Nov. 21, 1969
Division of Ser. No. 684,437,
Nov. 20, 1967, Pat. No. 3,538,964
[45] Patented Sept. 14, 1971
[73] Assignee Rockwell Manufacturing Company
Pittsburgh, Pa.

[54] SAW TABLE GAGE
4 Claims, 6 Drawing Figs.
[52] U.S. Cl. .................................................... 143/169, 143/51, 143/6
[51] Int. Cl. ...................................................... B27b 27/06
[50] Field of Search .......................................... 143/169, 170, 168, 51, 51 A, 6

[56] References Cited
UNITED STATES PATENTS
1,985,614  12/1934  Merrigan ...................... 143/169
3,051,204  8/1962  Gaskell ........................ 143/169

Primary Examiner—Donald R. Schran
Attorney—Strauch, Nolan, Neale, Nies & Kurz

ABSTRACT: A tilting arbor table saw angle or mitre gage with adjustment controls and angle scale grouped and arranged for operation and viewing by an operator standing in operating position at the front of the saw.

PATENTED SEP 14 1971
3,604,482
SHEET 1 OF 3
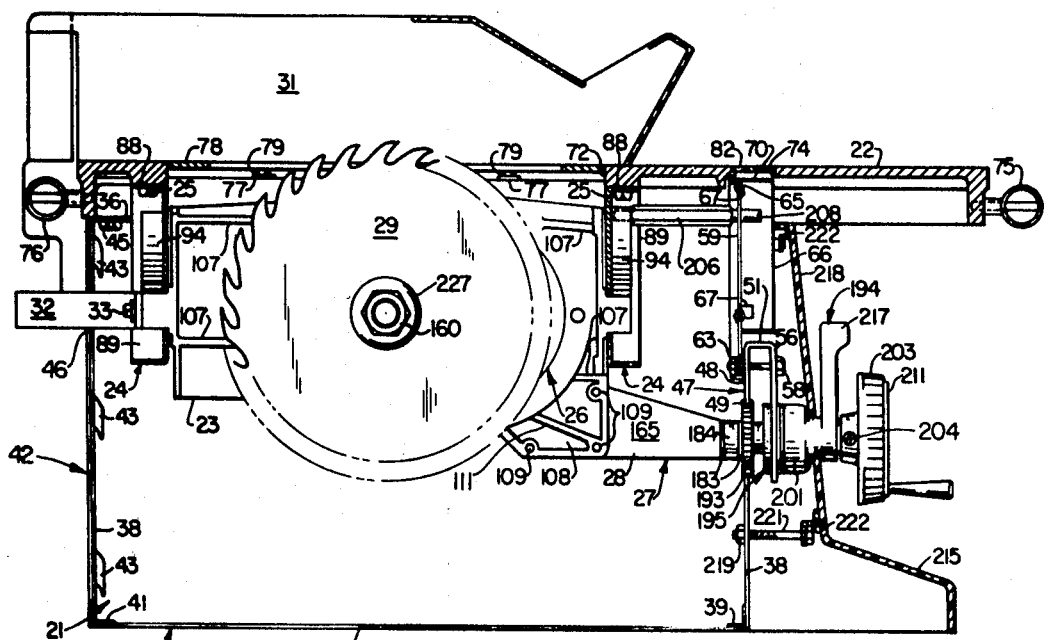
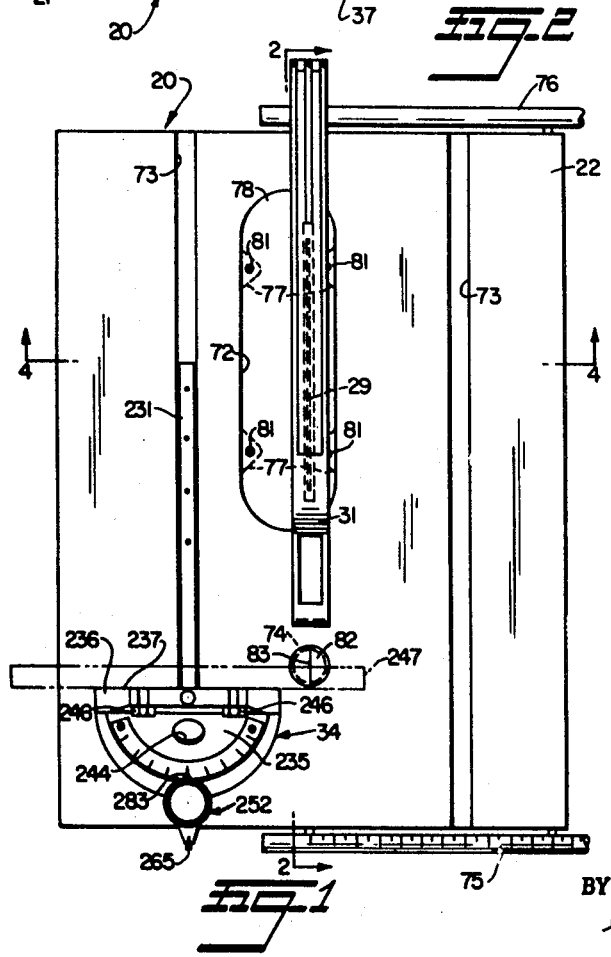
INVENTORS
EDWARD C. WARRICK
EMERSON BERENDS
BY *Hauch, Nolan, Neale, Nies & Kurz*
ATTORNEYS

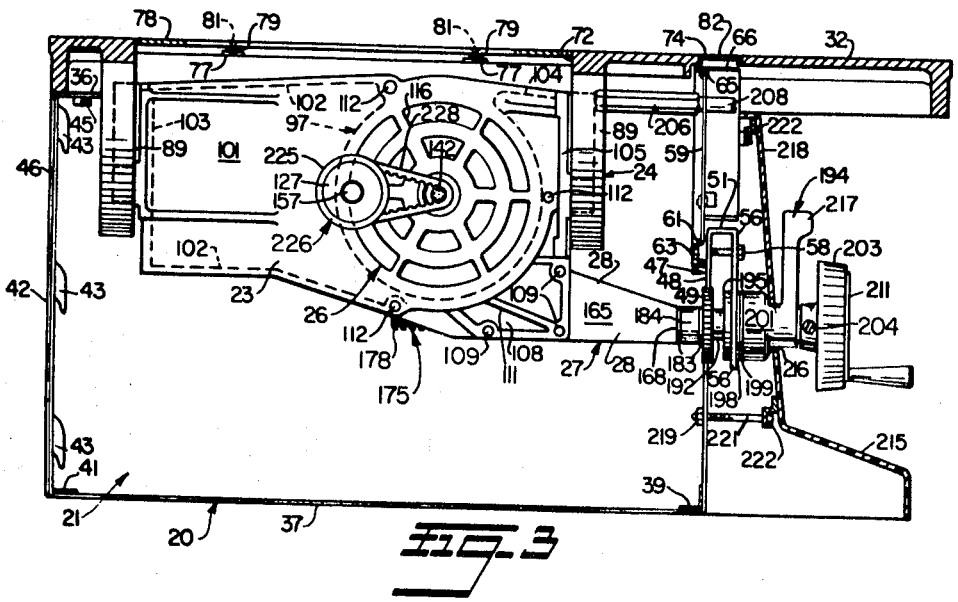
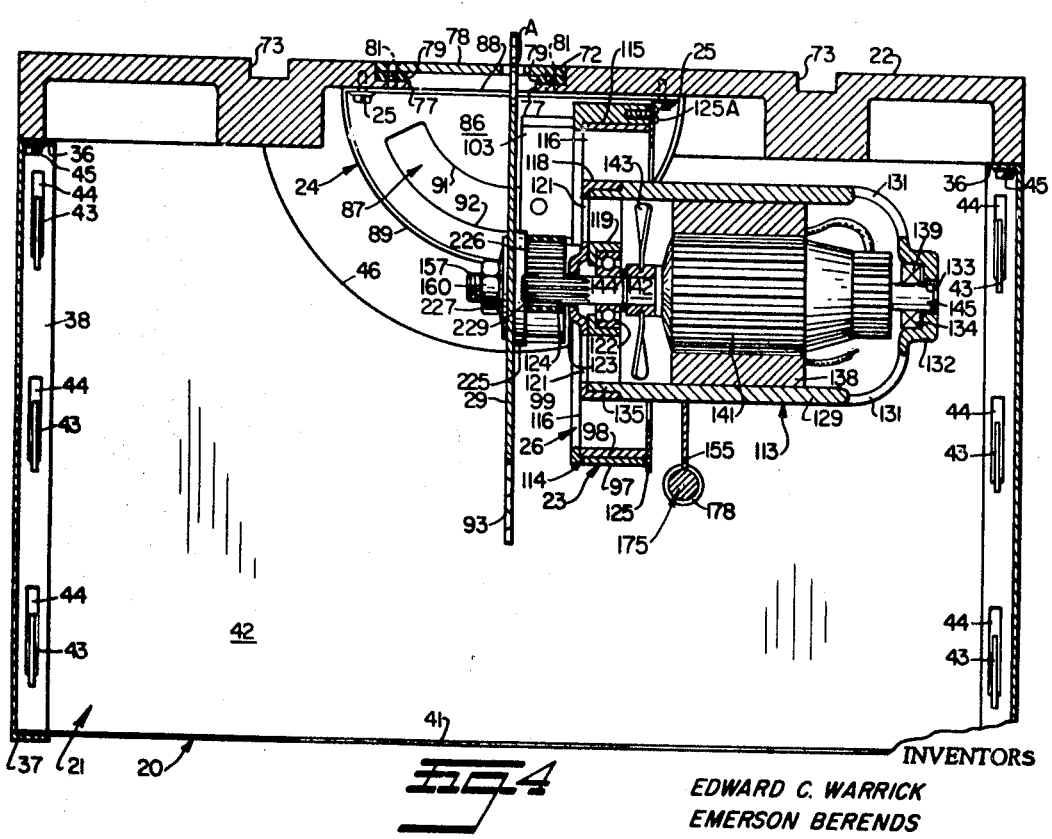

INVENTORS
EDWARD C. WARRICK
EMERSON BERENDS

BY *Strauch, Nolan, Neale, Nies + Kurz*
ATTORNEYS

SAW TABLE GAGE

This is a division of copending application Ser. No. 684,437 filed Nov. 20, 1967 U.S. Pat. No. 3,538,964 for Motor Driven Table Saw.

BACKGROUND

This invention relates to tilting arbor bench saw table or mitre gages provided as accessory equipment therewith. Representative mitre gage prior art comprises U.S. Pat. No. 1,164,253 to A. G. Borntraeger, U.S. Pat. No. 2,356,610 to H. F. Penney and U.S. Pat. No. 2,873,773 to W. L. Gaskell.

SUMMARY

A primary object of the present invention is to provide a tilting arbor saw with an improved mitre gage having an angle scale and a primary angle stop member respectively viewable and operable from the standing position in front of the table saw.

A still further object of the present invention resides in the provision of a mitre gage comprising a guide bar, a mitre gage body pivoted to the guide bar and including a workpiece abutment wall providing a vertical laterally directed workpiece engaging wall and an arcuate flange carried by the abutment wall in spaced overhanging relation to the guide bar and providing an arcuate clamping edge, upwardly facing graduated angle scale, and dependent stop lugs at the midpoint and 45° angle points of the scale, and a clamp block and stop assembly fixed to the guide bar in operative juxtaposition to the arcuate flange including a stop plate selectively movable from a stop position beneath the arcuate flange to an inoperative position beyond the flange edge, a clamp plate having an end portion overlying the arcuate flange, and a clamp stud and knob assembly fixed to the guide bar with the stud shank passing freely upwardly through the clamp block, stop plate, and clamp plate and threadingly receiving the clamp knob for securing the stop plate in a selected one of its positions and clamping the clamp plate against the arcuate flange to fix the mitre gage body in a selected angular position.

BRIEF DESCRIPTION OF THE DRAWINGS

Other objects will appear from the appended claims and following description when read in conjunction with the accompanying drawings wherein:

FIG. 1 is a top plan view of a saw embodying the present invention;

FIG. 2 is a sectional view of the saw of FIG. 1 taken substantially on line 2—2 of FIG. 1;

FIG. 3 is a sectional view similar to FIG. 2 with the saw blade removed to better illustrate the drive connection between the motor shaft and blade supporting arbor shaft;

FIG. 4 is a sectional view of the saw of FIG. 1 taken substantially on line 4—4 of FIG. 1;

DESCRIPTION OF THE PREFERRED EMBODIMENT

Figure 5:
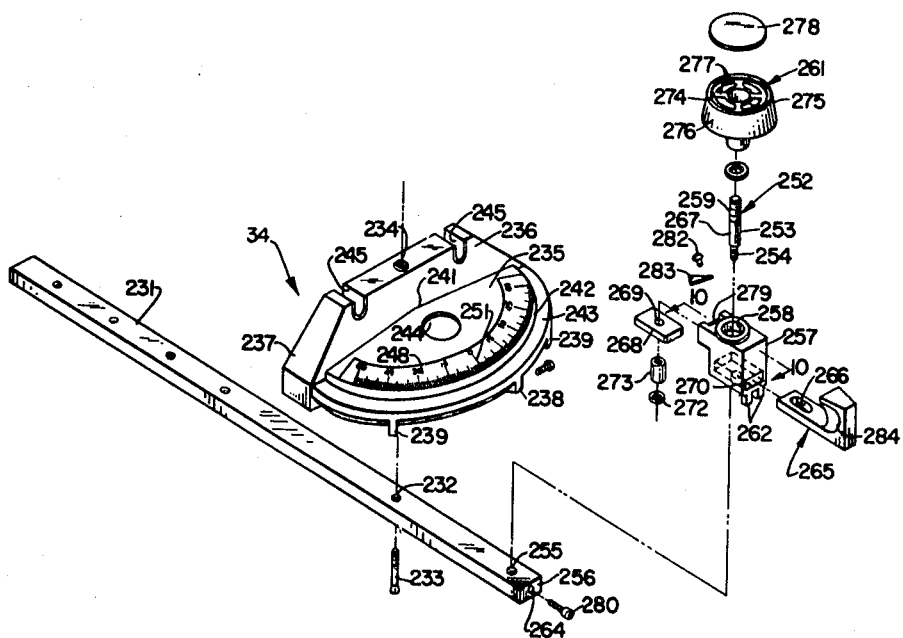
FIG. 5 is an exploded view of the mitre gage of the present invention.
Figure 6:
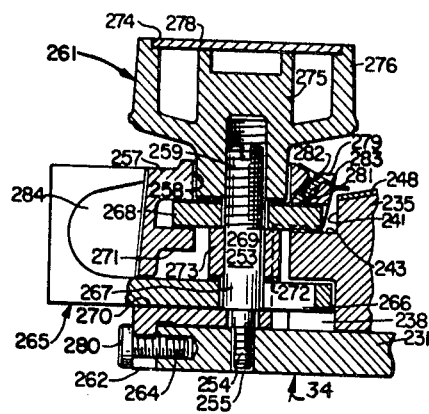
FIG. 6 is a fragmental longitudinal sectional view illustrating the cooperation of the mitre gage clamp block.

With continued reference to the drawings wherein like reference numerals are used throughout the several views of a drawing to indicate the same parts, the tilting arbor saw 20 of the aforesaid copending application principally composed of a support base or cabinet assembly 21 having a work support table 22 bolted thereto, a tilt bracket 23 suspended from table 22 by front and rear trunnions 24 bolted to lands formed on the table underside by bolts 25 (FIGS. 2 and 4) for tilt movement around tilt axis A (FIG. 4), a blade and arbor means 26 journaled in tilt bracket 23, tilt and raising and lowering control means 27 fixed to a sidewall of tilt bracket 23 through a control shaft support bracket 28, a circular saw blade 29, a pivotally mounted saw blade guard assembly 31 carried by a support bracket 32 bolted at 33 (FIG. 2) to the rear end of tilt bracket 23 is illustrated to show the manner in which the mitre gage assembly 34 (FIGS. 1, 5 and 6) of the present invention is intended to be used. As best shown in FIGS. 2, 3 and 4 support base or cabinet assembly 21 is made up of a spaced pair of side plates 35 having inturned top flanges 36, inturned bottom flanges 37, inturned end flanges 38 cross connected in opposed space relation by an angle bar 39 extending between the front ends of bottom flanges 37, a strap member 41 extending between the rear ends of bottom flanges 37 and a rear closure plate 42 interconnected to the rear end flanges 38 through L-shaped vertically spaced hangers 43 interfitted into vertical slots 44 formed in rear end flanges 38. Work support table 22 is bolted at the front and rear ends of top flanges 36 by bolts 45, the rear bolts only being shown in FIGS. 2, 3 and 4. As best seen in FIGS. 2, 3 and 4, rear closure plate 42 at its upper center is provided with an arcuate cutout portion 45 through which the blade guard support bracket 32 extends.

The front end of support base or cabinet assembly 23 is spanned about midway of its height by a bracket member 47 bolted at its ends to inturned front end flanges 38 and composed of a backwall 48 formed at its center portion to provide an arcuate downwardly facing rack gear segment 49 (FIGS. 2 and 3) having axis A as its center and along its upper edge with a forwardly directed cross flange 51 carrying a dependent wall section 56 arcuately slotted opposite and below gear segment 49 using axis A as a center for a purpose to be presently pointed out. Dependent wall section 56 and back wall 48 at a point laterally centered with respect to their ends to lie in the vertical plane containing axis A and above slot 57 are provided with aligned passages to freely pass a capscrew 58 the inner shank end of which pivotally mounts a segment plate 59 having a journal bore (not shown) through a sleeve bushing 61 (FIG. 3) and a retainer assembly including an abutment washer and nut 63. Segment plate 59 is of generally triangular configuration in plan, has an arcuate edge opposite journal bore 60 and is provided at its other two corners with arcuately shaped screw slots 65 (FIG. 3) adapted to receive mounting screws for securing a generally arcuate tilt or bevel scale platen 66 in abutting relation to the arcuate edge through securing ears 67 struck out of platen 66. The upper face of platen 66 has a bevel scale plate 71 secured thereto.

Work support table 22, as best seen in FIG. 1, is provided with the customary through blade opening 72, a respective mitre gage groove 73 at each side of blade opening 72 extending parallel to the long axis of blade opening 72 from the front edge to the rear edge of the table, and a through stepped circular sight opening 74 forwardly of blade opening 72 to be located over tilt scale 70 in laterally centered relation on the tilt axis of the saw hereinafter described. The front and rear edges of the work support table are suitably drilled and tapped in customary manner to mount front and rear guide rails 75 and 76 for mounting a rip fence (not shown). Rail 75, as seen in FIG. 1, is conventionally graduated to provide a scale for accurately setting the rip fence in well-known manner. Blade opening 72 is provided along its side edges near the bottom table face with inwardly directed, tapped ears 77 for supporting a blade opening closure insert plate 78 of conventional construction. To assure proper levelling of insert plate 78 with the adjacently related table surface, compressible rubber bushings 79 are interposed between ears 77 and the underside of insert plate 78 in surrounding relation to countersunk securing screws 81 entered downwardly through screw openings provided in insert plate 78 into tapped ears 77. As a consequence of this use of simple, inexpensive rubber bushings and downwardly directed screws 81, insert plate 78 can be fully and accurately assembled from the top of work support table 22 merely by entering screws 81 through the respective plate screw openings, the respective rubber bushings and threading them into ears 77 to compress the bushings until the upper plate surface is drawn down into the blade opening until flush with the worktable surface as determined by the eye, the touch, or sliding a test block back and forth across insert plate 78. If insert plate 78 is found to be too high or too low at any point, a simple tightening or loosening of the adjacently related screw or screws 81 can be effected to adjust its level as may be necessary. Stepped sight opening 74 is fitted with a transparent lens plate 82 having an index mark 83 extending diametrically thereof to cooperate with the tilt or bevel scale 71 in reading the tilt angle of the saw blade as will be more fully hereinafter explained. Since it is not necessary to remove lens plate 82 to adjust the tilt scale, it is preferably factory fitted to assure its being level with the work support surface of table 22 and permanently fixed in sight opening 74 by suitably cementing or other means.

As best seen in FIGS. 2 and 4 trunnions 24, comprise one-piece stampings providing a planar wall 86 arcuately slotted at 87 and a continuous edge flange right-angularly related to wall 86 composed of a planar mounting flange portion 88 apertured to receive bolts 25 to secure the trunnions to table 22 and a depending arcuate flange portion 89. Arcuate slots 87 are respectively dimensioned in a radial direction to provide radially spaced elongated arcuate wall portions 91 and 92 formed as a part of a circle having as a radius the distance between the tilt axis A (FIG. 4) which comprises the line of intersection between the plane of the work support surface of table 22 and the median plane of saw blade 93. The respective lower wall portions 92 of trunnions 24 form tracks or rails for slidably suspending tilt bracket 23 from the underside of table 22 through arcuate trunnion protrusions 94 provided on the respective end walls of tilt bracket 23 and of complemental arcuate configuration but of shorter length than slots 87 to assure that relative vertical movement between trunnions 24 and tilt bracket 23 is prevented (See FIG. 6). To prevent relative axial movement between tilt bracket 23 and trunnions 24, the bases of protrusions 94 are peripherally enlarged to form abutment lands 95 which slidably bear upon the slot-defining portions of the opposing faces of the respective trunnion walls 86. As a consequence, tilt bracket 23 is positively constrained to bodily shifting movement around tilt axis A to thereby vary the included angle between work support table 22 and all portions of tilt bracket 23 and any structure carried thereby.

As best shown in FIG. 3, tilt bracket 23 comprises a one-piece casting comprising a cylindrical housing portion 97 having a stepped journal bore 98 therethrough forming at one end of bore 98 an inwardly directed annular abutment flange 99 (FIG. 4) which constitutes in effect an extension of outwardly converging planar wall 101 extending away from one side of bore 98 and carrying right-angularly related, upper and lower flanges 102 (FIG. 3) and terminating in a right-angularly related end wall 103 (FIG. 3) and extending away from the other side of housing 97 and carrying a short right-angularly related upper flange 104 and a depending end wall 105 terminating slightly below the tapped ear 106. Suitable reinforcing webs 107 connect wall 101 and the trunnion bearing end walls 103 and 105 of tilt bracket 23 to reinforce the wall portions which extend beyond wall 101.

Tilt bracket 23 adjacent the lower right-hand quadrant of bore 98 as viewed in FIGS. 2 and 3 and at the face of housing 97 opposite wall 101 is provided with an integrally formed, outwardly directed, rearwardly flanged, mounting pad 108 having three tapped corner bores 109 reinforced along its backwall by an integral web 111. Through tapped bores 112 are formed in ear 106 and housing 97 at 120° intervals around bore 98 for a purpose which will now be described in detail.

Referring to FIG. 4, electric motor 113 includes a separately mounted motor end bell and arbor shaft support member 114 having a cylindrical rim 115 dimensioned to provide a journaled fit in bore 98 of housing 97, five inwardly directed spokes 116 and a journal boss (not shown) equiangularly spaced around the inside of rim 115 and terminating radially inwardly thereof in an annular ring formation 118, and a hub portion 119 carried by angularly spaced spider arms 121 centered with respect to spokes 116 and journal boss 117. As best seen in FIG. 4, spokes 116, journal boss 117, and a motor mounting ring formation 118 extend axially 78 one end of rim 115 to a point about midway of the length of rim 115, the journal boss has a through bore (not shown) radially disposed to cut into rim 155, spider arms 121 have a minimal axial thickness and are located at said one end of rim 115, and hub portion 119 is axially coextensive with ring formation 118 and is provided with a multistepped through bore forming from right to left in FIG. 4 a seat for the front rotor shaft bearing 122, an outer bearing race abutment shoulder 123, and a rotor shaft opening 124. End bell and arbor shaft support member 114, with arbor shaft and arbor shaft bearing assembly hereinafter described in detail in place, is held in assembled relation in bore 98 for journaled movement as hereinafter pointed out by a retainer ring 125 (FIG. 4) secured to housing 97 by three capscrew and lockwasher assemblies 125a (FIG. 4) threaded into tapped bores 112 of housing 97. Retainer ring 125 is provided along its inner peripheral edge with an approximate 90° arcuate recess the opposite ends of which form limit stops for cooperation with the protruding end of a roll pin as will appear from reference to the aforementioned copending application Ser. No. 684,437 force fitted in a blind bore (not shown) provided in the rearmost face of rim 115 angularly adjacently related to the clockwise edge of journal boss 117. The protrusion of the roll pin is correlated so the protruding end face does not extend a substantially greater distance than the thickness of ring 125. The radial width of ring 125 is selected to exceed the combined thickness of rim 115 (FIG. 4) and the cylindrical wall of housing 97 and its inner edge, except in the area of arcuate recess 126 where the inner edge of the narrowed portion is radially outwardly disposed to clear the roll pin, extends slightly inwardly of rim 115 for a purpose to be presently pointed out.

Motor housing 129 (FIG. 4) at one end is provided with radial spider arms 131 (preferably six equiangularly spaced) supporting a centered hub portion 132 having a concentrically related shaft bore 133 extending axially inward into an enlarged annular recess forming a bearing seat 134 while the other end is open and defined by an annular, axially directed mounting flange 135 dimensioned to enter into motor mounting ring formation 118 and provides an axially inwardly spaced annular abutment shoulder (FIG. 4) disposed to abut the rear end face of ring formation 118 when assembled as shown in FIG. 4. Motor housing 129 mounts stator windings 138 fixed to motor housing 129 in conventional manner, rear shaft bearing 139 mounted in seat 134, and 194 assembly 141 including shaft 142 with fan 143 fixed thereon by split ring 144 entered through stator winding 138 to dispose the rear end 145 of shaft 142 in bearing 139 prior to assembly with end bell and arbor shaft support member 114. Opposing brush holders, brushes, c8 and brush-securing caps (not shown) are likewise preassembled in diametrically opposed tapped housing openings (not shown) immediately after rotor assembly 141 is inserted in housing 129 as will appear from the aforesaid copending application. The front rotor shaft bearing 123 being in place in seat 122 of member 114, motor housing 129 with its rotor assembly 141 and brush assembly in place is assembled with end bell and arbor shaft support member 114 by entering shaft 142 into front shaft bearing 123 and axially moving motor housing 129 and the assembled motor parts toward housing 97 until shaft 142 protrudes through rotor shaft opening 124 and annular mounting flange 135 is fully inserted into ring formation 118 to abut annular abutment shoulder 137 with the opposing end face of ring formation 118. Housing 129 is then fixed to member 114 by means of a pair of long capscrews passed through lockwashers, washer (not shown), the end apertures of elevating worm gear segment 155 (FIG. 4), and diametrically opposed ears formed on housing 129 and threaded into blind tapped bores (not shown) in the rear face of ring formation 118 all located radially inwardly of retainer ring 125 as will appear from reference to the aforesaid copending application Ser. No. 684,437.

Arbor shaft 157 is preassembled with its arbor bearing by passing the plain end of shaft 157 containing retainer ring groove through the bore 161 of the arbor bearing to expose the ring groove at the rear end of the bearing and inserting the split retainer ring in the ring groove. Arbor shaft 157 is thereby fixed against axial disassembling movement forwardly in the arbor shaft bearing. The shaft bearing of the preassembled arbor shaft and bearing assembly is preferably dimensioned to snugly fit the fore of boss 117 and is a length just equal to the axial dimension of rim 115 and is mounted in boss 117 prior to assembly of end bell and arbor shaft bearing support member 114 in bore 98 of tilt bracket 13. Upon assembly of member 114 with arbor shaft and arbor shaft bearing in place into bore 98 from the rear of tilt bracket 13, arbor shaft 157 will pass inwardly of flange 99 to project forwardly from housing 97 and the front end face of rim 115 and the arcuate segment of the outer race of the arbor bearing lying within the notch of rim 115 will engage the inner radial face of flange 99 to retain member 114 and the arbor bearing against forward axial movement respecting tilt bracket 23. Attachment of retainer ring 125 is then effected by passing it forwardly around motor housing 129 into position against the rear face of housing 97 and the rear face portion of the outer race of the arbor bearing, which protrudes rearwardly from boss 117 in the arcuate notch of rim 115 to the rear edge of rim 115, and threading screws 125a home in tapped bores 112 of housing 97. Ring 125, due to its end butting engagement with the rear face of rim 115 and the rear face portion of the outer race of the arbor bearing, retains member 114 and the arbor bearing against rearward axial movement respecting tilt bracket 23. Arbor shaft 157 is fixed against axial movement with respect to the arbor bearing by the blade drive pulley and clamping assembly upon tightening clamp nut 160 as will be more fully hereinafter described. To assure free angular adjusting movement of member 114 together with the arbor shaft and arbor shaft bearing carried in boss 117, a running clearance is provided between the end faces of rim 115 and the outer bearing race of the arbor bearing on the one hand and flange 99 and ring 125 on the other hand by appropriate axial dimensioning of rim 115, the arbor bearing, and journal bore 98.

With member 114 mounted in tilt bracket 23 as just described and carrying motor casing 129 and the arbor shaft and arbor shaft bearing assembly, in fixed relative position as heretofore described, worm gear segment 155 will be disposed beneath motor casing 129 in close rearwardly spaced relation to the rear face of tilt bracket 23 and its dependent mounting pad 108 and the arbor shaft will lie parallel to the coincident axes of bore 98 and member 114 for 90° clockwise movement between its normal lowered position approximately as shown in FIGS. 2 and 3 to its maximum raised position determined by the uppermost limit stop provided by the arcuate recess in retainer ring 125 as will be clear from reference to the aforesaid copending application.

Tilt bracket mounting pad 108 mounts on its planar back face lying in the plane of the rear face of cylindrical housing 97 an elongated control shaft support bracket 28 of generally channel configuration in cross section which comprises a planar mounting wall 165 (FIGS. 2 and 3) formed at its inner left end as seen in FIG. 3 with three through screw openings (not shown) spaced to cooperate with tapped bores 109 of pad 108, respective end walls one of which is designated 168, and respective sloping top reinforcing walls integrally joined to the top edges of wall 165, and the end walls. Suitable capscrews passing freely through the screw openings (not shown) and threaded into tapped bores 109 of pad 108 fixedly secure support bracket 28 to pad 108 with its end wall 168 spaced beyond pad 108 toward the open front end of base or cabinet assembly 21. The opposite end walls of support bracket 28 are provided with respective axially spaced coaxial through bores (not shown) one of which, that is wall 168, is of a lesser diameter than the other. These coaxially arranged bores serve as journal bores for a main control shaft 175 (FIG. 3) having a worm portion 178 at its left end meshed with worm segment 155 (FIG. 4) and a reduced diameter portion dimensioned to extend from the inner face of end wall 168 where it is provided with a ring groove at its juncture with the main shaft section which forms an abutment shoulder at a distance slightly less than the spacing between the outer face of the end wall of bracket 28 remote from end wall 68 and the inner face of end wall 168 so a fiber wear washer may be disposed in light abutting contact between the abutment shoulder and the inner face of end wall 168 to assure free rotation of shaft 175 in its journal bores.

The reduced diameter portion of shaft 175 extends through wall 168 to a point well beyond the open front end of base or cabinet assembly 21 and is provided at its free end with a ring groove and an axially inwardly spaced through bore adapting it to mount an adjusting hand wheel 203. Shaft 175 is fixed against relative axial movement with respect to support bracket 28 by a second fiber wear washer 183 and a set collar 184 assembled on the reduced shaft portion from its free end into light bearing contact with the outer face of end wall 168 and the opposing end face of collar 184 which is fixed to shaft 175 by tightening a setscrew (not shown). The reduced shaft portion is then provided with a third fiber wear washer 183 and a sleeve shaft 192 (FIG. 3), including integral spur gear wheel 49, journaled on shaft portion 175 in subjacent meshing engagement with gear segment 48 of bracket member 47. Sleeve shaft 192 terminates inwardly of the hub of hand wheel 203 and the through bore of shaft 175 and mounts a clamp assembly 194 made up of a flanged clamp sleeve 195 including a reduced diameter noncircular formation dimensioned to slidingly cooperate with the arcuate slot in wall 56 bracket member 47 and fix clamp sleeve 195 against free relative rotation on sleeve shaft 192 and a cylindrical threaded shank 197 passing freely through the arcuate alot of bracket wall 56 to receive wear washer 198 and a wavy spring washer 199 held in place by the internally threaded hub of lock lever 201 threaded on shank 197. The end of sleeve shaft 192 projecting beyond the hub of lock lever 201 is annularly grooved and mounts an annularly flanged tilt hand wheel 203 which is nonrotatably fixed to sleeve shaft 192 by a setscrew 204 engaged in the annular groove. Clockwise rotation of lever 201 advances the hub of lever 201 axially along clamp sleeve 195 to yieldingly clampingly engate wall 56 of bracket member 47 between the clamping flange of clamp sleeve 195 and washer 198 through the intermediary of spring washer 199 and the abutting end face of the hub of clamp lever 201 to arrest tilt movement of bracket 23 relative to base or cabinet assembly 23 and table 22 at any selected angular adjustment through shaft 175 and and support bracket 28 carried by tilt bracket 23. When a tilt adjustment is to be made lever 201 is rotated in a counterclockwise direction to relieve the clamp pressure and tilt hand wheel 203 is rotated in the desired direction. Corresponding movement of tilt scale plate 71 is assured through the provision of a cam drive pin 206 (FIGS. 2 and 3) having one end fixedly threaded into the adjacently related trunnion protrusion 94 formed on the end of tilt bracket 23 and its other end in the form of a cylindrical tip 208 drivingly extending through the arcuate cam slot of pivoted segment plate 59. Since main control shaft 175 journals in sleeve shaft 192 and support bracket 27 and due to its nonreversible worm drive connection to worm gear segment 155 is self-locking in any selected tilted position of the tilt bracket 23 and saw blade 29, it will be appreciated that blade raising and lowering movement can be effected at any time merely by grasping and turning adjusting handwheel 211 nonrotatably and axially fixed to the reduced diameter end of shaft 175.

Assembly of hand wheels 203 and 211 is effected after front cover assembly 215 containing arcuate slot 216 is slipped over the free forward ends of shafts 175 and 192 to dispose the reduced-diameter hub of lock lever 201 in forwardly protruding position in arcuate slot 216 with its lever arm 217 disposed to swing back and forth in front of the rearwardly inclining cover wall 218. Hex headed thread cutting screws 219 passing freely through the inturned end flanges 38 of cabinet sideplates 35 at laterally aligned points below bracket member 47 and elongated spacer sleeves 221 and threaded into through apertures in angle tabs 222 spot welded to the inner face of wall 218 fix cover assembly 215 to sideplates 35.

Blade 29 and shaft 157 are clamped to the inner race of the arbor bearing between snapring 162 and clamp nut 160 by abutting the blade side faces between the clamp flange 225 of splined pulley sheave 226 (FIGS. 3 and 4) and clamp plate or flange 227. A spacer washer (not shown) is preferably interposed between the inner end face of pulley sheave 226 and the opposed end face of the inner race of the arbor bearing to assure adequate running clearance between pulley sheave 226 and flange 99 of tilt bracket 23. A positive drive belt 228 encompassing the pulley sheave 226 and the splined end 229 of rotor shaft 142 provides a direct drive connection between rotor shaft 142 and arbor shaft 157 and blade 29. By suitably relating the diameter of pulley sheave to the diameter of the splined end of rotor shaft 142, a desired rotating speed of blade 29 is obtained. Since the motor, arbor assembly and blade, and the blade raising and lowering controls and tilt controls are all directly carried by the tilt bracket 23 and compactly fixedly related around tilt bracket bore 98, an unusually accurate and rigid saw assembly conveniently arranged for adjustment and operation from a standing position at the front of the saw is provided by the structure so far described. This convenience of adjustment and operation is furthered by the mitre gage construction which will now be described in detail.

Referring principally to FIGS. 1, 9 and 10, the mitre gage 34 carried in one or the other of table grooves 73 comprises a slide or guide bar 231 dimensioned to closely slidingly fit in grooves 73 with its top face flush with the work support surface of table 22 and drilled inwardly from one end at 232 to freely receive pivot screw 233 with its shank protruding upwardly from the plane of the top surface of bar 231 and threaded into tapped bore 234 of mitre gage body 235 to pivotally connect body 235 to bar 231. Body 235 includes an upstanding wall portion 236 providing a planar work-engaging face 237 right-angularly related to the plane of the bar top surface and the work support surface of table 22 and an arcuate segment 237 integrally formed on the face of wall portion 236 opposite face 237 adjacent the base of wall portion 236 using the pivot axis of screw 233 as a center. The rim of segment 237 is undercut to form a dependent rib 238, and two dependent ribs 239 located respectively in clockwise and counterclockwise disposed relation to a plane containing the pivot axis of screw 233 and the longitudinal centerline of bar 231 at 45 percent intervals clockwise and counterclockwise from rib 238 for a purpose to be presently pointed out. The upper face of segment 237 slopes radially away from a point 241 on the opposite face of wall portion 236 determined by a vertical plane containing the longitudinal centerline of bar 231 to an arcuate vertical wall 242 inset from the peripheral edge of segment 237 to form an inwardly extending arcuate clamp surface 243 coextensive with the peripheral edge of segment 237. A circular laterally centered recess 244 may be provided in the sloping top wall of segment for receiving an identification disc bearing the manufacturer's name and trademark.

The upper edge of wall portion 236 at opposite sides of the aforesaid plane is provided with respective upwardly opening slots 245 parallel to the aforesaid plane. Grooves 245 have straight vertical sides and are adapted to receive the shanks of clamp bolts or screws 246 threaded into a jig fixture, preferably in the form of an elongated wooden block 247 (see dot-dash lines FIG. 1), conventionally provided by the user to increase the lateral dimension of the work-engaging wall where workpieces of great length are to be cut. Due to the straight sided grooves the jig fixture can be assembled or disassembled on mitre gage body 235 with screws 246 in place therein merely by loosening screws 246 to back the screwheads away from their clamping position against the opposite face of wall portion 236 and lifting the fixture with screws 246 in place vertically, an impossibility in the conventional prior art structures where the walls of the screw holes partially or completely encircle the screws. The sloping face of arcuate segment 237 contiguous to arcuate shoulder 241 mounts an arcuate scale plate 248 graduated in degrees to angles of 60° in both directions from a zero indexing mark 251 lying in the aforesaid parallel plane.

Mitre gage body 235 is normally fixedly secured to bar 231 by a clamp assembly 252 and fixed to the end bar 231 adjacent the edge of arcuate segment 237 and shown in detail in FIGS. 9 and 10. Clamp assembly 252 comprises an upstanding stud 253 having a reduced diameter threaded end 254 threaded into tapped bore 255 provided in bar 231 inwardly from its end 256, an internally ribbed, open-ended clamp block 257 having a stepped through vertical bore 258 therein to freely receive the upstanding threaded shank end 259 of stud 253 and the hub portion of an internally threaded knurled clamp nut 261 threaded onto stud shank end 259, dependent laterally spaced ears 262 abuttingly engaging the end face 256 of bar 231 at opposite sides of tapped bore 264, a slide stop member 265 having a body portion slidably received in rectangular opening 270 of block 257 and slotted at 266 to freely slidingly pass the unthreaded shank portion 267 of stud 253, and an elongated clamp plate 268 apertured at 269 to freely pass stud 253 and supported in vertically upwardly spaced relation to slide stop member 265 above inwardly extending rib 271 of block 257 which its innermost end clearing rib 271 by a wear washer 272 and spacer bushing 273 interposed between the upper face of slide stop member 265 and the underface of clamp plate 268 in surrounding relation to the shank of stud 253. Spacer bushing 273 is axially dimensioned so that its upper end face will protrude slightly above the upper face of rib 271 when assembled in position on wear washer 272 to assure a tight clamping of slide stop 265 and the mitre gage body 235 upon tightening of knurled knob to force the outer free end of clamp plate 268 against the arcuate clamp surface 243 of mitre gage body 235 (FIG. 10). As best seen in FIGS. 9 and 10, knurled knob 261 is annularly recessed at 274 and formed with an inset hub portion 275 joined to knurled rim 276 by spider arms 277 to conserve material and lighten the nut and is preferably closed by a snap-in insert plate 278 of any suitable material. A headed machine screw 280 threaded into tapped bore 264 engages the dependent ears 262 to fix block 275 against shifting movement relative to bar 231 and stud 253.

Referring particularly to FIG. 10, the upper end of block 257 overlying clamp surface 243 of mitre gage body 235 is notched at 279 to provide an outwardly and downwardly sloping bottom wall drilled and tapped at 281 to receive an attachment screw 282 for adjustable fixing a pointer 283 having a tip overlying scale plate 248 to cooperate with the angle indicia formed thereon. Angular adjustment of mitre gage assembly 34 is readily effected by an operator standing in normal operating position at the front of saw 20 as heretofore pointed out by loosening knurled knob 261 to release the clamping pressure on clamp plate 268 and grasping mitre gage body 253 and pivoting it around pivot screw 233 to register pointer 283 with the desired graduation on scale plate 248 and tightening knurled knob 261. Since scale plate 248 slopes downwardly toward the operator, precise adjustment to the desired angle may be visibly effected from a normal standing position. In event counterclockwise pivoting movement to the frequently used 45° position to the right in FIG. 1 is desired slide stop member 265 may be employed merely by leaving it in its innermost position as shown in FIG. 10 and pivoting body 235 until rib 239 at the right of rib 238 abuts the opposing side face of slide stop member 265. Return movement to the normal 90° cutting position shown in FIG. 10 is likewise effected by clockwise pivoting movement of body 235 until rib 238 abuts the opposite opposing side face of slide stop member 265. In event counterclockwise angular adjustment beyond the 45° angular position is desired or clockwise angular adjustment beyond the normal 90° position is desired, the operator, after loosening knurled knob 261, grasps the finger hold portion 284 of slide stop member 265 and pulls outwardly to shift slide stop member 265 to the left as seen in FIG. 10 until the opposite end of slot 266 engages stud 253. In this position the inner end of slide stop member 265 will be withdrawn from beneath the rim of segment 237 to a position clearing ribs 238 and 239 freeing mitre gage body 235 for free pivoting movement in either direction. The opposite 45° angular adjustment can be rapidly effected by first withdrawing slide stop member 265 to clear rib 238 and then returning it to its innermost position so the opposite rib 239 will abut the side face of slide stop member 265 employed in setting the mitre gage 34 to its ninety degree cutting position.

It will be appreciated from the foregoing description that the tilt angle adjustment of the blade, raising and lowering of the blade, and angular cutting adjustment of the mitre gage from the operator's normal standing position at the front of the saw are made possible by this invention with equal facility as well as adjustment of the rip fence to determine accurate ripping widths of the workpiece in conventional manner and visual reading of the blade tilt scale, the mitre gage angle scale and the rip fence scale.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A mitre gage assembly for use with a table saw including a worktable having upwardly opening mitre gage mounting grooves, blade tilt controls including a tilt scale viewable from above the table with the operator in standing position in front of said worktable, and blade tilt and raising and lowering controls disposed at the front of the table and accessible to the standing operator comprising a mitre gage slide bar adapted to be mounted in a selected mounting groove; a mitre gage body pivoted adjacent the end of said bar disposed at the front of said worktable and including an upstanding wall portion having a planar work support face right-angularly related to and extending laterally beyond the sides of said guide bar and an arcuate flange portion extending from the face of said wall portion opposite said planar work support face in a plane vertically spaced from said guide bar; arcuate scale means containing angle graduations fixed to the upper face of said body flange inwardly from its arcuate edge; a clamp block mounting stud fixed to said guide bar adjacent the end of said guide bar in upstanding relation to said guide bar in adjacently spaced relation to the edge of said arcuate flange portion; a clamp block including vertically spaced base and top walls having respective aligned passages to closely and to freely receive said clamp block mounting stud, an upstanding wall connecting the adjacently related outer ends and side edges of said base and top walls and having a noncircular guide passage extending therethrough in the plane of the upper face of said base wall, said clamp block base wall abuttingly engaging the upper face of said guide bar and having depending laterally spaced ears abuttingly engaging the end face of said one end of said guide bar; an L-shaped slide stop member having one leg axially slotted to closely receive said stud and shaped to fit and slidably extend through said noncircular guide passage for axial sliding movement from a stop position beneath the arcuate edge of said arcuate flange to an inoperative position radially outwardly of said arcuate edge; a clamp plate dimensioned to be received between sides of said upstanding wall and having a through passage to closely receive said clamp block mounting stud, said clamp plate having an end overlying the arcuate edge of said arcuate flange; a washer and spacer bushing mounted on said clamp block mounting stud between said one leg of said L-shaped stop member and said clamp plate to support said clamp plate in vertically spaced relation to said leg of said slide stop member positioned between the sides of said upstanding wall; and a clamp nut threaded on the upper end of said clamp block mounting stud and including a shank portion extending downwardly through the top wall passage of said clamp block into end abutting relation to said clamp plate and adapted, when tightened, to force said clamp plate toward said one leg of said L-shaped stop member to clampingly engage said clamp plate end with said arcuate flange to fix said mitre gage body in any preselected pivotal position and said slide stop member in a selected one of its two positions.

2. The mitre gage of claim 1 wherein the other leg of said L-shaped slide stop member extends upwardly along the outer face of said upstanding wall of said clamp block and its opposite side faces are provided with respective finger hold recesses to provide a reduced thickness finger hold portion therebetween whereby ready shifting of said stop member between its operative stop position and its inoperative position may be affected.

3. The mitre gage of claim 1 wherein said arcuate flange position of said mitre gage body includes a reduced thickness peripheral edge adjacently related to said arcuate scale means, the upper inner end of said clamp block overlies said reduced thickness peripheral edge and is provided along the outer edge of its upper face with an end opening notch the bottom wall of which slopes downwardly and outwardly and is provided with a tapped blind bore, and pointer means, comprising a through apertured pointer plate and an attachment screw projecting from said through aperture and threaded into said blind bore, is angularly adjustably fixed to said sloping bottom wall with its pointer tip in close overlaying relation to said scale means whereby accurate angular adjustment of said mitre gage can be effected by an operator standing in normal operating position at the front of the saw.

4. The mitre gage of claim 1 wherein said arcuate flange portion of said mitre gage body is provided with three dependent, generally radially directed ribs angularly spaced along its outer edge to respectively provided (1) a vertical wall offset to one side of zero marking of said arcuate scale means, (2) a vertical wall offset beyond the clockwise located 45° marking of said arcuate scale means, and (3) a vertical wall offset beyond the counterclockwise 45° marking of said arcuate scale means, and respective stop screws are threaded through tapped through cross passages in said respective dependent ribs with their shank ends directed toward said respective markings of said arcuate scale means to form adjustable abutment stops for said stop member whereby said mitre gage may be calibrated to establish accurate angular positioning thereof relative to said slide bar to assure accuracy of angular cuts in said saw.

UNITED STATES PATENT OFFICE
CERTIFICATE OF CORRECTION

Patent No. 3,604,482　　　　　　Dated September 14, 1971

Inventor(s)　E. C. Warrick and E. Berends

It is certified that error appears in the above-identified patent and that said Letters Patent are hereby corrected as shown below:

Column 2, line 17, change "45" to --46--.
Column 3, line 75, change "78" to --from--.
Column 4, line 3, change "155" to --115--.
　　　　　, line 44, (wrongly numbered 45), change "194" to --rotor--.
　　　　　, line 49, (wrongly numbered 50), after "brushes," delete "c8".
Column 6, line 30, change "alot" to --slot--.
　　　　　, line 39, (wrongly numbered 40), change "engate" to --engage--.
　　　　　, line 46, delete the first "and".
Column 8, line 2, delete the word "and" after "252".
　　　　　, line 2, insert the word --of-- after the word "end".
　　　　　, line 20, change "which" to --with--.
　　　　　, line 37, (wrongly numbered 38), change "275" to --257--.
Column 10, line 29, Claim 3, change "position" to --portion--.

Signed and sealed this 23rd day of May 1972.

(SEAL)
Attest:

EDWARD M. FLETCHER, JR.　　　　　　ROBERT GOTTSCHALK
Attesting Officer　　　　　　　　　Commissioner of Patents